April 13, 1937.   F. L. HENNING   2,076,842
FLUID CONTROL DEVICE
Filed May 2, 1934
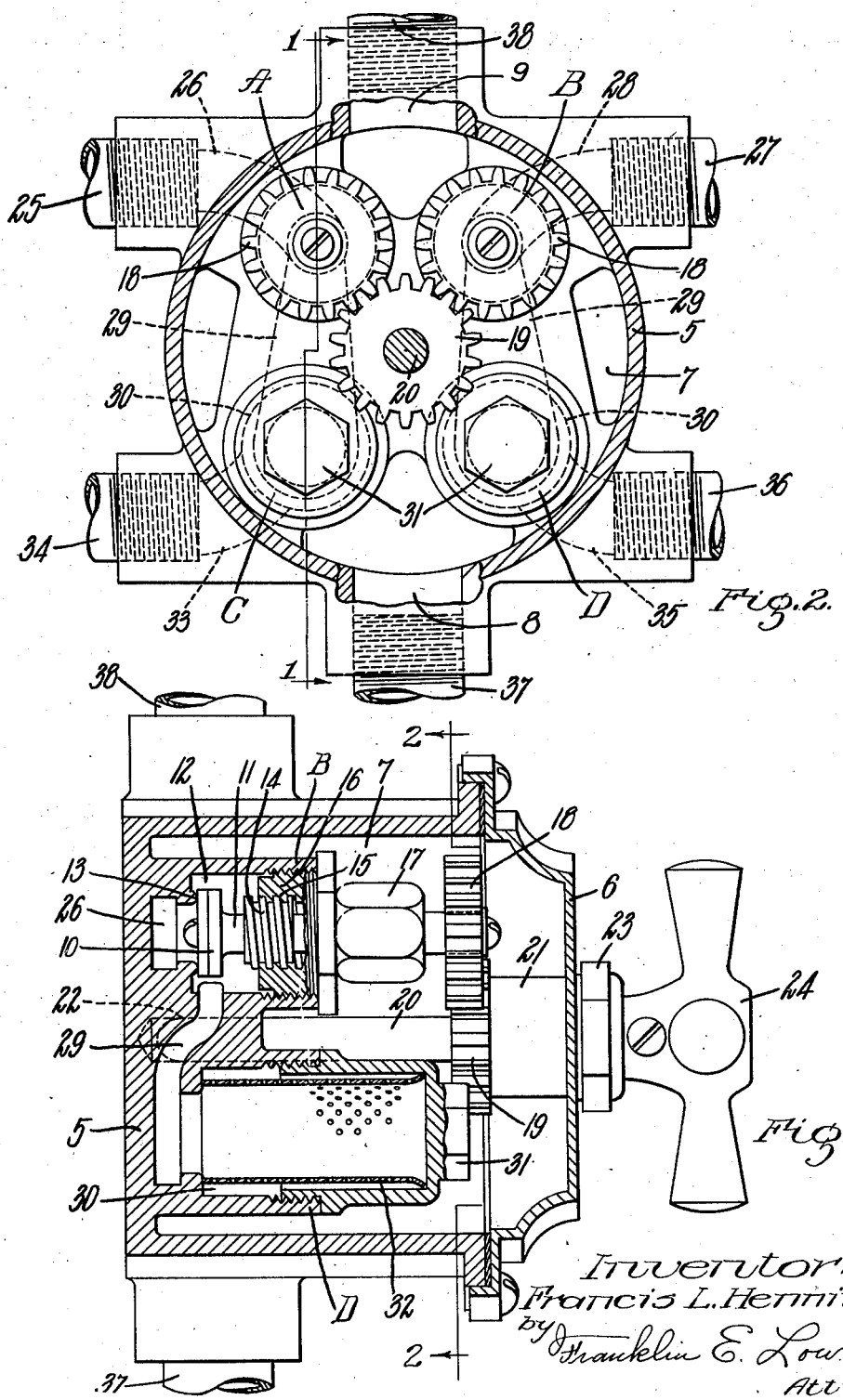
Inventor:
Francis L. Henning,
by Franklin E. Low
Att'y.

Patented Apr. 13, 1937

2,076,842

UNITED STATES PATENT OFFICE 2,076,842

FLUID CONTROL DEVICE

Francis L. Henning, Charlestown, Mass., assignor of one-half to Jacob A. Stryker, Arlington, Mass.

Application May 2, 1934, Serial No. 723,532

2 Claims. (Cl. 210—166)

This invention relates to an improvement in fluid control devices and has for an object to provide a device for simultaneously controlling the flow of hot and cold water to another device in which said hot and cold water is united and by means of which the proportion of hot and cold water utilized in maintaining the mixed water at a predetermined temperature is controlled.

Hot and cold water mixing valves are often very complicated in construction and some municipalities make it compulsory that strainers be provided either in the structures of the valves themselves or in the hot and cold water piping connections leading to the mixing valve. As strainers soon become clogged with foreign particles, it is often necessary to employ the services of a skilled mechanic whenever it is necessary to clean or replace these strainers. The cost, therefore, for servicing such valves is often excessive because it is often necessary to dismantle portions of the valve in order to gain access to the strainers.

It is an object, therefore, of this invention to provide a control device of the character mentioned which may be utilized as a means for simplifying the piping installation and reducing the number of accessories required for a fluid mixing valve, thereby reducing the cost of the installation.

Another object of this invention is to provide a fluid control device having valve mechanisms for hot and cold water embodied therein which will be confined in such a manner that danger of damaging leakage from the control device will be reduced to a minimum.

With these objects in mind this invention contemplates providing a casing having a main chamber therein which also constitutes a passage through which a fluid may flow through the casing, said fluid entering said chamber at one side of the casing and passing outwardly therefrom at the other side thereof. Mounted in this main chamber, side by side, are valves for controlling the amount of hot and cold water which is to be delivered to a mixing valve, said hot and cold water valves being operated simultaneously by a single operating mechanism which is mounted upon and carried by a cover for the casing. By confining these valves within the casing any leakage at the stuffing boxes thereof will merge with the water passing through the casing. Also located within the main chamber, within closed individual auxiliary chambers are strainers for the hot and cold water, and these strainers may be easily and quickly removed and cleaned or replaced at any time by simply shutting off the hot and cold water supply valves.

The invention consists in a fluid control device for a hot and cold water mixing valve as set forth in the following specification and particularly as pointed out in the claims thereof.

Referring to the drawing:—

Fig. 1 represents a vertical sectional elevation of a control device embodying my invention, said section being taken approximately on the line 1—1 of Fig. 2 and looking in the direction of the arrows on said line.

Fig. 2 is a vertical sectional elevation taken on the line 2—2 of Fig. 1 looking in the direction of the arrows in said line.

Like numerals refer to like parts throughout the views of the drawing.

In the drawing, 5 is a casing and 6 is a cover provided therefor. The casing 5 is provided with a chamber 7 therein which also constitutes a fluid passage extending entirely through said casing from top to bottom thereof and permitting a fluid to flow transversely therethrough. The fluid enters the chamber 7 at the bottom thereof at 8, circulates therethrough around portions of the mechanism located therein and finally passes outwardly therefrom at the top thereof at 9.

Located in the casing 5 and positioned side by side within the chamber 7 thereof is a hot water valve mechanism A and a cold water valve mechanism B, said mechanisms being adapted to control the flow of hot and cold water respectively through the control device. The valve mechanisms A and B are preferably identical in construction and embody therein movable valve members 10 formed integral with valve stems 11 and located within auxiliary valve chambers 12.

The valve members 10 are moved into and out of engagement with valve seats 13 in any suitable manner, but preferably a screw-threaded portion 14 of the valve stem 11 engages a co-operating screw-threaded portion 15 of a bushing 16 which constitutes a closure for the auxiliary valve chamber 12. A stuffing box 17 is also provided for the valve stem 11 and is attached to the bushing 16. A spur gear 18 is rigidly secured to the valve stem 11. The valve mechanisms A and B are operated in unison to open and close said mechanisms simultaneously by means of a gear 19 fast to a spindle 20 rotatably mounted in a bearing 21 forming a part of the cover 6. The gear 19 meshes with both of the gears 18. The inner extremity of the spindle 20 projects into a hole 22 provided at the rear of the casing 5 and constitutes a bearing portion therefor. A stuffing box 23 is provided for the spindle 20 where it projects through the cover 6 and a handle 24 is rigidly secured to the outer extremity of said spindle. By rotating the handle 24 in the proper direction the spindle 20 and gear 19 fast thereto will cause the gears 18 and valve stems to which they are secured to be rotated in the proper directions to cause the valve members 10 to be moved into and out of engagement with their respective valve seats 13.

Hot water delivered to the casing 5 through a hot water supply pipe 25 passes to the auxiliary valve chamber 12 of the hot water valve mechanism A through a passage 26, and cold water delivered to the casing 5 through a cold water supply pipe 27 passes to the auxiliary valve chamber 12 of the cold water valve mechanism B through a passage 28. The auxiliary valve chambers 12 of both hot and cold water valve mechanisms are connected by means of similar passages 29 with auxiliary fluid chambers 30 for hot and cold water strainer mechanisms C and D, both of which are located side by side beneath the hot and cold water valve mechanisms A and B respectively. Covers 31 are provided for the auxiliary fluid chambers 30 and access is had to these covers by removing the cover 6 of the casing 5. Strainers 32 of any suitable type are located within the auxiliary fluid chambers 30 and project into the covers 31 and preferably the end portions of the strainers 32 which are located within the covers 31 are flared outwardly and frictionally engage the inner surface of the covers in such a manner that when the covers are removed the strainers will be removed in unison therewith. The auxiliary fluid chamber 30 of the hot water strainer mechanism C is connected by means of a passage 33 to a hot water discharge pipe 34 and the auxiliary fluid chamber 30 of the cold water strainer mechanism B is connected by means of a passage 35 with a cold water discharge pipe 36. The pipes 34 and 36 lead directly to a fluid mixing device not illustrated in the drawing and not forming a part of this invention, but in which the hot and cold water is mixed to provide hot water of a certain temperature for use in showerbaths and the like. After being mixed in the mixing device the mixed water is returned to the control device of this invention through a pipe 37, said mixed water entering the chamber 7 through the passage 8, circulating through said chamber 7 around the exterior of the strainer and valve mechanisms located therein, and finally passing outwardly therefrom through the passage 9 into a discharge pipe 38 through which it is delivered to the location where it is to be utilized.

The control device of this invention and the fluid mixing device for which it is provided are preferably furnished piped directly together by means of the pipe connections 34, 36 and 37, so that when the devices are installed the only connections that are required are those at 25, 27 and 38. The supply of hot and cold water for the mixing device is controlled at the device of this invention by operating the handle 24 at which time the valve mechanisms A and B are operated simultaneously to permit the hot and cold water to flow through the auxiliary valve chambers 12, passages 29, auxiliary chambers 30 and strainers 32 mounted therein and from thence to the mixing device.

If it is necessary to repair or service the mixing device, the water is shut off at the control device by operating the handle 24. Likewise, whenever it is necessary to clean or replace a strainer 32 the hot and cold water supplies are first shut off by operating the handle 24, after which the cover 6 is removed from the casing 5. The water is then drained from the chamber 7, after which access may be had to the strainers 32 by removing the covers 31.

If at any time it should happen that there is leakage at the stuffing boxes 17 around the valve stems 11, the leakage will merge with the water that is passing through the chamber 7.

I claim:

1. A fluid control device comprising, in combination, a casing provided with a main chamber therein constituting a fluid passage extending entirely through said casing, said casing also having a plurality of auxiliary fluid passages extending therethrough, each of which has communication with an auxiliary chamber within said main chamber, a strainer within each auxiliary chamber in the path of a fluid passing therethrough, a cover for said casing, a valve for each of said auxiliary fluid passages mounted within said main chamber, each valve having an independent valve stem embodied therein which is confined within the casing, a stuffing box for each valve stem also confined within the casing and insertable therein through the main chamber, and means carried by said cover and operatively connected within said chamber to each of said valve stems to operate all of said valves in unison.

2. A fluid control device comprising, in combination, a casing provided with a main chamber and plurality of auxiliary chambers therein through which a fluid may circulate, said casing also having a plurality of fluid passages therein each of which communicates with an auxiliary chamber, a cover for said casing, a strainer within each auxiliary chamber intercepting the fluid passing therethrough, said strainer being insertable within said auxiliary chamber through said main chamber, a valve for each of said fluid passages mounted within the casing, each valve having an independent valve stem embodied therein which is confined within the casing, a stuffing box for each valve stem also confined within the casing and insertable therein through the main chamber, a gear fast to each valve stem, a handle carried by said cover, and a gear actuated by said handle and operatively connected within said main chamber to said first mentioned gears to operate all of said valves in unison.

FRANCIS L. HENNING.